(12) United States Patent
Kubo et al.

(10) Patent No.: US 12,476,095 B2
(45) Date of Patent: Nov. 18, 2025

(54) SAMPLE ANALYZING APPARATUS AND METHOD

(71) Applicant: JEOL Ltd., Tokyo (JP)

(72) Inventors: Ayumi Kubo, Tokyo (JP); Masaaki Ubukata, Tokyo (JP); Kenji Nagatomo, Tokyo (JP)

(73) Assignee: JEOL Ltd., Tokyo (JP)

( * ) Notice: Subject to any disclaimer, the term of this patent is extended or adjusted under 35 U.S.C. 154(b) by 342 days.

(21) Appl. No.: 18/226,493

(22) Filed: Jul. 26, 2023

(65) Prior Publication Data
US 2024/0038513 A1 Feb. 1, 2024

(30) Foreign Application Priority Data
Jul. 28, 2022 (JP) .................. 2022-120745

(51) Int. Cl.
H01J 49/00 (2006.01)
G16C 20/20 (2019.01)

(52) U.S. Cl.
CPC .......... H01J 49/0036 (2013.01); G16C 20/20 (2019.02)

(58) Field of Classification Search
CPC .................. H01J 49/0036; G16C 20/20
See application file for complete search history.

(56) References Cited

U.S. PATENT DOCUMENTS

| 9,857,377 B2* | 1/2018 | Zhao .................. G01N 33/6848 |
| 2014/0274751 A1 | 9/2014 | Sadowski et al. |
| 2015/0186754 A1 | 7/2015 | Paauw |
| 2016/0202219 A1* | 7/2016 | Sakamoto .......... H01J 49/0036 702/23 |
| 2019/0043703 A1* | 2/2019 | Bern .................. G01N 33/6848 |
| 2019/0172695 A1 | 6/2019 | Nagatomo et al. |
| 2021/0132013 A1 | 5/2021 | Kawamura et al. |
| 2021/0247360 A1 | 8/2021 | Hayakawa |

FOREIGN PATENT DOCUMENTS

| JP | H10254352 A | 9/1998 |
| JP | 2014524568 A | 9/2014 |
| JP | 6994921 B2 | 1/2022 |
| WO | 2018138901 A1 | 8/2018 |
| WO | 2019240289 A1 | 12/2019 |

OTHER PUBLICATIONS

Extended European Search Report issued in EP23186097.4 on Dec. 12, 2023.

(Continued)

Primary Examiner — Sean M Luck
(74) Attorney, Agent, or Firm — The Webb Law Firm

(57) ABSTRACT

A first searcher executes a primary search with respect to a primary library based on a sample mass spectrum. The primary library includes a plurality of standard mass spectra. When a judging unit judges that a search range is to be enlarged, a second searcher executes a secondary search with respect to a secondary library based on the sample mass spectrum. The secondary library includes a plurality of predicted mass spectra produced from a plurality of molecular structures.

13 Claims, 16 Drawing Sheets

(56) References Cited

OTHER PUBLICATIONS

Zhang et al.; Prediction of electron ionization mass spectra based on graph convolutional networks, International Journal of Mass Spectrometry vol. 475, No. 116817, 2002, pp. 1-8.

Wei et al., Rapid Prediction of Electron-Ionization Mass Spectrometry using Neural Networks, arXiv:1811.08545 [physics.chem-ph], Nov. 21, 2018, pp. 1-24.

Yen et al., Spectrum-to-S[ectrum Searching Using a Proteome-wide Spectral Library, The American Society for Biochemistry and Molecular Biology, Inc., 2011, pp. 1-15.

Wei et al., Rapid Prediction of Electron-Ionization Mass Spectrometry Using Neural Networks, ACS Central Science, 2019, vol. 5, pp. 700-708.

Office Action issued in JP2022-120745 on Apr. 16, 2024.

* cited by examiner

FIG. 3

| COMPOUND ID | MOLECULAR WEIGHT | ACCURATE MASS | ... | COMPO-SITIONAL FORMULA | MOLECULAR STRUCTURE | STANDARD SPECTRUM | ... |
|---|---|---|---|---|---|---|---|
| ****** | ****** | ****** | ... | ****** | ****** | ******* | ... |
| ****** | ****** | ****** | ... | ****** | ****** | ******* | ... |
| ****** | ****** | ****** | ... | ****** | ****** | ******* | ... |
| ... | ... | ... | ... | ... | ... | ... | ... |

FIG. 6

| COMPOUND ID | MOLECULAR WEIGHT | ACCURATE MASS | ... | COMPO-SITIONAL FORMULA | MOLECULAR STRUCTURE | PREDICTED SPECTRUM | ... |
|---|---|---|---|---|---|---|---|
| ****** | ****** | ****** | ... | ****** | ****** | ******** | ... |
| ****** | ****** | ****** | ... | ****** | ****** | ******** | ... |
| ****** | ****** | ****** | ... | ****** | ****** | ******** | ... |
| ... | ... | ... | ... | ... | ... | ... | ... |

SAMPLE ANALYZING APPARATUS AND METHOD

CROSS REFERENCE TO RELATED APPLICATION

This application claims priority to Japanese Patent Application No. 2022-120745 filed Jul. 28, 2022, the disclosure of which is hereby incorporated by reference in its entirety.

BACKGROUND OF THE DISCLOSURE

Field of the Disclosure

The present disclosure relates to a sample analyzing apparatus and method, and in particular to a technique for determining or estimating a molecular structure of a compound forming the sample.

Description of Related Art

For identifying a compound (that is, determining a molecular structure of the compound), an EI mass spectrum library is used. For example, an EI mass spectrum library provided by the National Institute of Standards and Technology (NIST) includes EI mass spectra acquired through mass spectrometry of 300 thousand or more compounds.

The EI mass spectrum is a mass spectrum acquired by performing mass spectrometry of a compound under application of an electron ionization (EI) method. The EI mass spectrum normally includes a relatively large number of fragment ion peaks. An EI mass spectrum acquired through the mass spectrometry of a sample is compared with a plurality of EI mass spectra in the EI mass spectrum library. Based on the result of comparison, a molecular structure of the compound forming the sample may be determined.

For identifying the compound, a general compound database is also used. For example, in PubChem, which is a representative compound database, more than 100 million compounds are registered. If the compound database is used, the molecular structure of the compound forming the sample can be narrowed down based on a molecular weight, an accurate mass, or a compositional formula of the compound forming the sample. However, the EI mass spectrum is not registered in general compound databases.

The number of registered compounds in the EI mass spectrum library is much smaller than the number of registered compounds in the compound database. In the compound identification using the EI mass spectrum library, often, a situation arises where there is no EI mass spectrum in the EI mass spectrum library that matches the EI mass spectrum acquired from the sample.

Document 1 (JP 6994921 B) discloses a technique to process a first mass spectrum acquired under a hard ionization method, and a second mass spectrum acquired under a soft ionization method. Document 1 is silent on a predicted mass spectrum.

Document 2 (Jennifer N. Wei et al., Rapid Prediction of Electron-Ionization Mass Spectrometry Using Neural Networks, ACS Publications, 2019, pp. 700-708) discloses an EI mass spectrum library. The EI mass spectrum library is formed from a plurality of measured EI mass spectra and a plurality of predicted EI mass spectra. A molecular fingerprint defined from the molecular structure of each compound is input to a prediction model, and the prediction model produces the predicted EI mass spectrum. Document 2 does not describe stage-wise use of a measured EI mass spectrum library and a predicted EI mass spectrum library.

SUMMARY OF THE DISCLOSURE

An advantage of the present disclosure lies in enlargement of a range of compounds which may be estimated in the estimation of the molecular structure through mass spectrum matching. Alternatively, an advantage of the present disclosure lies in distinguishingly using a plurality of kinds of mass spectrum libraries having different properties or performances. Alternatively, an advantage of the present disclosure lies in improvement of estimation precision in the molecular structure estimation using a predicted mass spectrum library.

According to one aspect of the present disclosure, there is provided a sample analyzing apparatus comprising: a first storage unit configured to store a primary library having a plurality of standard mass spectra acquired from a plurality of compounds forming a first compound group, and a plurality of molecular structures corresponding to the plurality of standard mass spectra; a second storage unit configured to store a secondary library having a plurality of predicted mass spectra corresponding to a plurality of compounds forming a second compound group, and a plurality of molecular structures corresponding to the plurality of predicted mass spectra; a primary searcher configured to execute a primary search with respect to the primary library based on a sample mass spectrum acquired from a sample; a judging unit configured to judge enlargement of a search range based on a result of the primary search; and a secondary searcher configured to execute a secondary search with respect to the secondary library based on the sample mass spectrum, when it is judged that the search range is to be enlarged, to thereby estimate a molecular structure of the sample.

According to another aspect of the present disclosure, there is provided a method of analyzing a sample, the method comprising: executing, based on a sample mass spectrum acquired from a sample, a primary search with respect to a primary library having a plurality of standard mass spectra acquired from a plurality of compounds forming a first compound group, and a plurality of molecular structures corresponding to the plurality of standard mass spectra; judging enlargement of a search range based on a result of the primary search; and executing, based on the sample mass spectrum, a secondary search with respect to a secondary library having a plurality of predicted mass spectra corresponding to a plurality of compounds forming a second compound group, and a plurality of molecular structures corresponding to the plurality of predicted mass spectra, when it is judged that the search range is to be enlarged, to thereby estimate a molecular structure of the sample.

BRIEF DESCRIPTION OF THE DRAWINGS

Embodiment(s) of the present disclosure will be described based on the following figures, wherein:

FIG. 3 is a diagram showing an example of a primary library;

FIG. 6 is a diagram showing an example of a secondary library;

DESCRIPTION OF NON-LIMITING EMBODIMENTS OF THE DISCLOSURE

Figure 1:
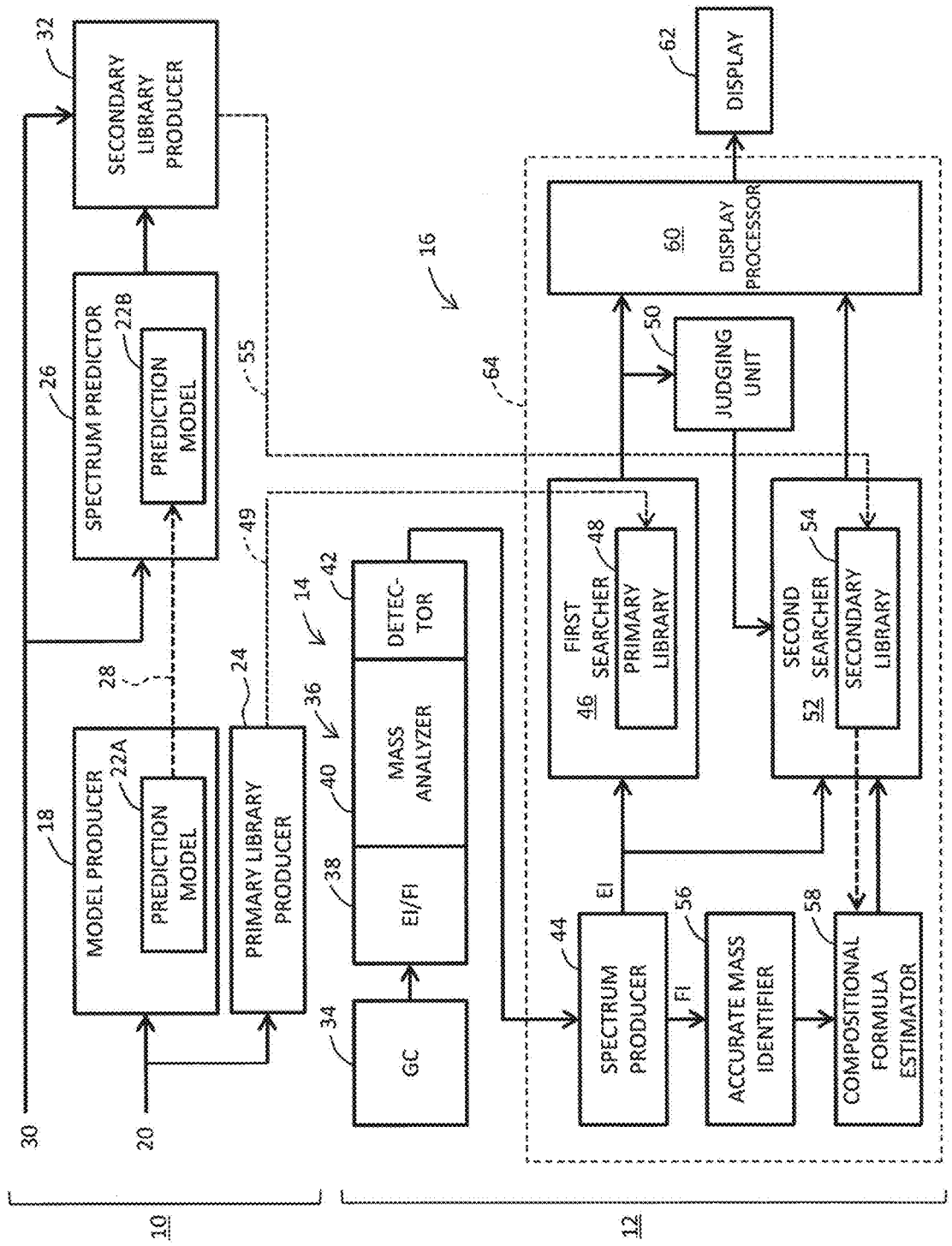
FIG. 1 is a block diagram showing a structure of a sample analyzing apparatus according to an embodiment of the present disclosure.

An embodiment of the present disclosure will now be described with reference to the drawings.

(1) Overview of Embodiment

A sample analyzing apparatus according to an embodiment of the present disclosure comprises a first storage unit, a second storage unit, a primary searcher, a judging unit, and a secondary searcher. The first storage unit stores a primary library. The primary library has a plurality of standard mass spectra acquired from a plurality of compounds forming a first compound group, and a plurality of molecular structures corresponding to the plurality of standard mass spectra. The second storage unit stores a secondary library. The secondary library has a plurality of predicted mass spectra corresponding to a plurality of compounds forming a second compound group, and a plurality of molecular structures corresponding to the plurality of predicted mass spectra. The primary searcher executes a primary search with respect to the primary library based on a sample mass spectrum acquired from a sample. The judging unit judges enlargement of a search range based on a result of the primary search. The secondary searcher executes a secondary search with respect to the secondary library based on the sample mass spectrum when it is judged that the search range is to be enlarged, to thereby estimate a molecular structure of the sample. The first storage unit corresponds to a first memory. The second storage unit corresponds to a second memory. A processor to be described below functions as the primary searcher, the judging unit, and the secondary searcher.

In the structure described above, necessity of execution of the secondary search is determined based on the quality of the result of the primary search. When the result of the primary search is superior, a possibility that the compound forming the sample is registered in the primary library is high, and thus, execution of the secondary search is skipped. In this case, the search time can be shortened. On the other hand, when the result of the primary search is inferior, the secondary search is executed. That is, the search range is enlarged. With this configuration, it is possible to increase the possibility of identifying the compound forming the sample.

In an embodiment of the present disclosure, the standard mass spectrum is a measured EI mass spectrum acquired through mass spectrometry of a compound. The predicted mass spectrum is an artificial EI mass spectrum predicted from a molecular structure of the compound. In general, the standard mass spectrum is more reliable than the predicted mass spectrum. Therefore, the primary search using the primary library is first executed, and then the secondary search using the secondary library is executed. The above-described configuration distinguishingly use two libraries in consideration of the respective advantages and disadvantages thereof. In the present disclosure, a sample is a compound to be analyzed. When a plurality of components are extracted from an original sample in gas chromatograph or the like, and each component is analyzed through mass spectrometry, each component is the compound to be analyzed; that is, the sample.

The secondary library may be produced in advance, or the secondary library may be produced at the point in time when sample molecular information is identified, as will be described below. Each of the primary library and the secondary library corresponds to a database. Alternatively, a primary library and a secondary library stored on a storage device on a network may be utilized. Alternatively, a single storage unit may be caused to function as the first storage unit and the second storage unit.

In an embodiment of the present disclosure, the plurality of predicted mass spectra are a plurality of mass spectra predicted from the plurality of molecular structures corresponding to the plurality of the compounds forming the second compound group. Alternatively, the predicted mass spectrum may be produced from the molecular structure using a learned prediction model (machine learning model).

In an embodiment of the present disclosure, the first compound group and the second compound group differ from each other. Each compound forming the first compound group is a compound for which a measured mass spectrum is already acquired. Each compound forming the second compound group is a compound for which the measured mass spectrum is not yet acquired. An existing EI mass spectrum library may be used as the primary library, or the primary library may be produced by information extracted from an existing EI mass spectrum library. The secondary library may be formed from a plurality of molecular structures extracted from an existing compound database and a plurality of predicted mass spectra produced based on the molecular structures.

In an embodiment of the present disclosure, the judging unit judges the enlargement of the search range based on a plurality of degrees of similarity calculated between the sample mass spectrum and the plurality of standard mass spectra. For example, when there is no item in the plurality of calculated degrees of similarity which satisfies a predetermined condition, it is highly likely that the compound forming the sample is not registered in the primary library. The enlargement of the search range is judged in such cases.

In an embodiment of the present disclosure, when a result of the secondary search is displayed, a predicted mass spectrum determined to be a hit in the secondary search is displayed along with the sample mass spectrum. According to this structure, through a visual comparison of the sample mass spectrum and the predicted mass spectrum, it is possible to confirm that the secondary search is correctly executed, or to evaluate reliability of the result of the secondary search. The predicted mass spectrum to be displayed is, for example, a predicted mass spectrum which has resulted in the highest degree of similarity.

In an embodiment of the present disclosure, the secondary searcher executes the secondary search in such a manner that a result of the secondary search is narrowed down by sample molecular information acquired through mass spectrometry of the sample. According to this configuration, estimation precision of the molecular structure can be improved by using both molecular information matching and mass spectrum matching. These matchings may be executed simultaneously or consecutively. In an embodiment of the present disclosure, the sample molecular information is at least one of a molecular weight, an accurate mass, or a compositional formula of the compound forming the sample.

In an embodiment of the present disclosure, the secondary library has a plurality of pieces of compound molecular information corresponding to the plurality of compounds forming the second compound group. The secondary searcher executes the secondary search with respect to the secondary library based on the sample molecular information and the sample mass spectrum. By executing the molecular information matching in addition to the mass spectrum matching, it is possible to more effectively narrow down the result of the secondary search in comparison to the case in which only the mass spectrum matching is executed.

In an embodiment of the present disclosure, the sample molecular information is identified based on a molecular ion peak included in another sample mass spectrum acquired from the same sample. For example, the sample mass spectrum is a mass spectrum acquired through application of a hard ionization method. The other sample mass spectrum is a mass spectrum acquired through application of a soft ionization method. The hard ionization method is an ionization method in which, in comparison to the soft ionization method, fragment ions tend to be more easily produced. The soft ionization method is an ionization method in which, in comparison to the hard ionization method, molecular ions tend to be more easily produced.

In an embodiment of the present disclosure, the sample analyzing apparatus further includes a predictor configured to produce a plurality of predicted mass spectra based on the sample molecular information. The plurality of predicted mass spectra in the secondary library are the plurality of predicted mass spectra produced by the predictor. According to this configuration, a scale of the secondary library can be reduced, and the search time can be shortened. When it takes a significantly long time to produce the plurality of predicted mass spectra, a secondary library which is produced in advance is utilized. A processor to be described below functions as the predictor.

According to another aspect of the present disclosure, there is provided a method of analyzing a sample, including a primary search step, a judging step, and a secondary search step. In the primary search step, a primary search with respect to a primary library is executed based on a sample mass spectrum acquired from a sample. The primary library has a plurality of standard mass spectra acquired from a plurality of compounds forming a first compound group, and a plurality of molecular structures corresponding to the plurality of standard mass spectra. In the judging step, enlargement of a search range is judged based on a result of the primary search. In the secondary search step, a secondary search with respect to a secondary library is executed based on the sample mass spectrum when it is judged that the search range is to be enlarged, to thereby estimate a molecular structure of the sample. The secondary library has a plurality of predicted mass spectra corresponding to a plurality of compounds forming a second compound group, and a plurality of molecular structures corresponding to the plurality of predicted mass spectra.

The method of analyzing the sample described above is realized as a function of hardware or as a function of software. In the case of the latter, a program for executing the method of analyzing the sample described above is installed to an information processing apparatus via a network or a transportable recording medium. The concept of the "information processing apparatus" encompasses a computer, a sample analyzing apparatus, a mass spectrometry apparatus, and the like. The information processing apparatus has a recording medium which non-transitorily stores the program. In the following, the "mass spectrum" will simply be called a "spectrum" in some cases.

(2) Details of Embodiment

FIG. 1 shows a sample analyzing system according to an embodiment of the present disclosure. The sample analyzing system is formed from an information processing apparatus and a sample analyzing apparatus 12. The sample analyzing apparatus 12 is more specifically a mass spectrometry apparatus, and is formed from a measurer 14 and an information processing unit 16.

First, the information processing apparatus 10 will be described. The information processing apparatus 10 is formed from, for example, a computer having a processor and a memory. The processor is more specifically a CPU which executes a program. In FIG. 1, a plurality of functions realized by the processor are represented by a plurality of blocks. The information processing apparatus 10 has a model producer 18, a primary library producer 24, a spectrum predictor 26, and a secondary library producer 32.

The model producer 18 produces a prediction model 22A for predicting an EI mass spectrum from a molecular structure of a compound. The model producer 18 is more specifically formed from a machine learner. During a machine learning process, a training data set acquired from an EI mass spectrum library 20 is supplied to the model producer 18. The prediction model 22A thus produced is supplied to the spectrum predictor 26 (refer to reference numeral 28). Alternatively, the model producer 18 and the spectrum predictor 26 may be integrated.

The primary library producer 24 produces a primary library based on information acquired from the EI mass spectrum library 20. The primary library is a database which is used in a primary search, which will be described later. The primary library includes a plurality of records corresponding to a plurality of first compounds forming a first compound group. Each record includes a standard mass spectrum (measured EI mass spectrum), a molecular structure, and the like.

The spectrum predictor 26 produces a predicted mass spectrum from the molecular structure, and has a learned prediction model 22B (machine learning model). A plurality of molecular structures from a compound database 30 are sequential supplied to the spectrum predictor 26. With this configuration, a plurality of predicted mass spectra (predicted EI mass spectra) are sequentially produced. The plurality of predicted mass spectra that are produced and the plurality of molecular structures corresponding thereto are supplied to the secondary library producer 32.

The secondary library producer 32 produces a secondary library based on information acquired from the compound database 30 and a plurality of predicted mass spectra which are produced. The secondary library is a database used in a secondary search to be described later. The secondary library includes a plurality of records corresponding to a plurality of second compounds. Each record includes the predicted mass spectrum (predicted EI mass spectrum), compound molecular information (molecular weight, accurate mass, compositional formula), the molecular structure, and the like.

As shown in FIG. 1, the primary library and the secondary library which are produced are transferred (copied) to the sample analyzing apparatus 12 (refer to reference numerals 49 and The EI mass spectrum library 20 described above is, for example, an EI mass spectrum library provide by the NIST. Alternatively, other EI mass spectrum libraries may be utilized. The compound database 30 described above is, for example, PubChem described above. Alternatively, other compound databases may be utilized.

In an embodiment of the present disclosure, the first compound group is formed from a plurality of compounds registered in the EI mass spectrum library. The second compound group is formed from a plurality of compounds which are registered in the compound database and which are not registered in the EI mass spectrum library. In other words, the first compound group and the second compound group do not overlap each other, and differ from each other. Alternatively, the two compound groups may partially overlap with each other as necessary.

Next, the sample analyzing apparatus 12 will be described. As described above, the sample analyzing apparatus 12 is formed from the measurer 14 and the information processing unit 16. An information processing unit 64 has a processor and a memory. The processor is more specifically a CPU which executes a program. In FIG. 1, a plurality of functions realized by the processor are represented by a plurality of blocks.

The measurer 14 is formed from a gas chromatograph (GC) 34 and a mass spectrometer 36. In the GC 34, a plurality of components that are timewise separated are created from the original sample. The plurality of components are sequentially introduced to the mass spectrometer 36. When viewed from the mass spectrometer 36, each component is a compound to be analyzed; that is, a sample.

The mass spectrometer 36 has an ion source 38, a mass analyzer 40, and a detector 42. In an embodiment of the present disclosure, the ion source 38 functions as an EI ion source following an electron ionization (EI) method, and as an FI ion source following an field ionization (FI) method. The EI method is a typical hard ionization method. The FI method is a typical soft ionization method. Examples of other soft ionization methods include a chemical ionization (CI) method. The hard ionization method is an ionization method in which, in comparison to the soft ionization method, fragment ions tend to more easily produced. The soft ionization method is an ionization method in which, in comparison to the hard ionization method, molecular ions tend to be more easily detected.

The mass analyzer 40 applies mass analysis of ions from the ion source. The mass analyzer 40 is formed from, for example, a time-of-flight type mass analyzer, or a quadrupole type mass analyzer. Alternatively, the mass analyzer 40 may be formed from other mass analyzers. The detector 42 detects ions passing through the mass analyzer 40. A detection signal from the detector 42 is sent through an electronic circuit (not shown) to the information processing unit 64.

In an embodiment of the present disclosure, first, the EI method is selected, and mass spectrometry is sequentially executed under the EI method on a plurality of components sequentially introduced from the GC 34. With this process, a first mass spectrum array is acquired. Then, the FI method is selected, and mass spectrometry is sequentially executed under the FI method on a plurality of components (which are basically identical to the plurality of components described previously) sequentially introduced from the GC. With this process, a second mass spectrum array is acquired. Alternatively, when the secondary search to be described below is not to be executed, the acquisition of the second mass spectrum array may be omitted.

In the illustrated example structure, the information processing unit 64 has a spectrum producer 44, a first searcher 46, a judging unit 50, a second searcher 52, an accurate mass identifier 56, a compositional formula estimator 58, a display processor 60, and the like. The first searcher 46 executes the primary search using a primary library 48. The first searcher 46 manages the primary library 48. The second searcher 52 executes the secondary search using a secondary library 54. The second searcher 52 manages the secondary library 54. In reality, the primary library 48 is stored in a first memory provided in the first searcher 46, and the secondary library 54 is stored in a second memory provided in the second searcher 52.

A display 62 displays an image showing a result of the primary search or an image showing a result of the secondary search. The display 62 is formed from, for example, an LCD. While an inputting device is connected to the information processing unit 64, illustration thereof is omitted.

The information processing unit 64 will now be described in further detail. The spectrum producer 44 produces a mass spectrum based on a detection signal from the measurer 14. More specifically, the spectrum producer 44 produces the first mass spectrum array based on the detection signal acquired under the EI method, and produces the second mass spectrum array based on the detection signal acquired under the FI method. Normally, the EI method is first executed, and the FI method is then executed. That is, the first mass spectrum array is first produced, and the second mass spectrum array is next produced. Alternatively, the spectrum producer 44 may be provided within the measurer 14.

The spectrum producer 44 also functions as a spectrum processing unit. That is, the spectrum producer 44 also has a function to correlate the first mass spectrum array and the second mass spectrum array, and a function to produce an accumulated mass spectrum for each component based on the mass spectrum array. These functions will be described later.

In the following, processing of the first mass spectrum and the second mass spectrum acquired from a certain unknown component (certain unknown compound) will be primarily described. The first mass spectrum is an accumulated EI mass spectrum, and the second mass spectrum is an accumulated FI mass spectrum. These mass spectra are both sample mass spectra.

First, the first searcher 46 functions. The first searcher 46 executes the primary search with respect to the primary library 48 based on the first mass spectrum. Specifically, the first mass spectrum is compared with a plurality of standard mass spectra in the primary library 48, to thereby calculate a plurality of degrees of similarity. Alternatively, in the first searcher 46, in addition to the mass spectrum matching, a compositional formula matching may be executed. With such a configuration, precision of identifying the compound can be improved.

The judging unit 50 judges enlargement of a search range based on the plurality of degrees of similarity which are calculated. Specifically, the judging unit 50 judges the enlargement of the search range; that is, execution of the secondary search, when the plurality of calculated degrees of similarity do not include an item that satisfies a predetermined condition; that is, when a possibility that the compound to be measured is included in the first compound group registered in the primary library 48 is low. On the other hand, the judging unit 50 judges skipping of the execution of the secondary search when the plurality of calculated degrees of similarity include an item that satisfies the predetermined condition; that is, when the possibility that the compound to be measured is included in the first compound group is high. When the compositional formula matching is executed in addition to the spectrum matching in the first searcher 46, the judging unit 50 may judge the enlargement of the search range based on the result of the spectrum matching and the result of the compositional formula matching.

When the secondary search is to be skipped, the result of the primary search is employed, and is sent to the display processor 60. The result of the primary search is formed from a plurality of pieces of information arranged in the order of magnitude of the degree of similarity. Each piece of information includes the degree of similarity, the molecular structure, the standard mass spectrum, and the like.

As the predetermined condition described above, arbitrary conditions may be determined. For example, when the degree of similarity varies from 1 to 1000 (with 1000 being the best degree of similarity), a condition that the plurality of the calculated degrees of similarity include a degree of similarly greater than or equal to 750 may be defined as the predetermined condition.

The accurate mass identifier 56 identifies a molecular ion peak included in the second mass spectrum prior to the secondary search, and identifies the accurate mass corresponding to the molecular ion peak. In this case, the molecular ion peak may be designated by the user, or may be automatically determined.

The compositional formula estimator 58 identifies one or a plurality of compositional formulae (one or a plurality of compositional formula candidates) from the identified accurate mass, prior to the secondary search. A compositional formula list is formed by the one or plurality of compositional formulae. For example, a range which takes an error into consideration is designated with respect to the accurate mass, and a large number of compositional formulae are identified based on the range. Alternatively, the compositional formula estimator 58 may identify one or a plurality of compositional formulae based on the accurate mass and a result of isotope pattern matching (degree of match). In identifying the compositional formula, the secondary library 54 is referred to. In this process, the compound database may be referred to. Each individual compositional formula may be called sample molecular information. Examples of other pieces of sample molecular information include the molecular weight and the accurate mass. The sample molecular information will be described later.

The second searcher 52 executes the secondary search with respect to the secondary library 54 based on the one or plurality of compositional formulae which are estimated, and the first mass spectrum. In this manner, in an embodiment of the present disclosure, the compositional formula matching is employed in combination and in addition to the mass spectrum matching. With this configuration, the result of the secondary search is narrowed down. Even when the prediction precision for the plurality of predicted mass spectra included in the secondary library 54 is low, with the use of the sample molecular information in the secondary search, the precision of the secondary search can be improved. The result of the secondary search is sent to the display processor 60. The result of the secondary search is formed from a plurality of pieces of information arranged in the order of magnitude of the degree of similarity. Each piece of information includes the degree of similarity, the molecular structure, the predicted mass spectrum, and the like.

The display processor 60 has a function to produce an image representing the result of the primary search and an image representing the result of the secondary search. The display 62 displays the image representing the primary search result or the image representing the secondary search result. Alternatively, a judgment result of the judging unit 50 may be displayed on the display 62.

Figure 2:
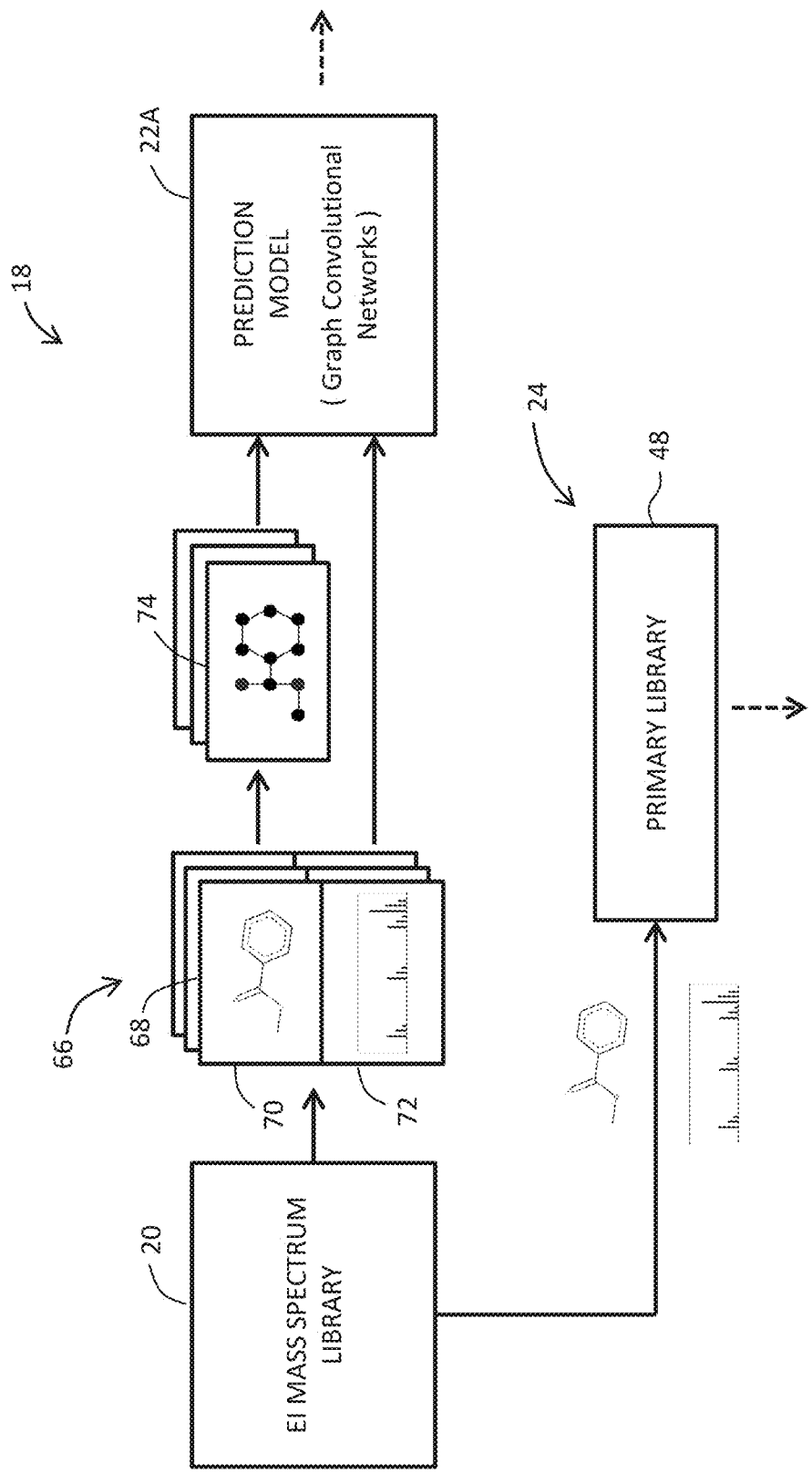
FIG. 2 is a diagram showing a method of producing a model.

The structures described above will now be described in more detail. FIG. 2 shows production of the prediction model. FIG. 2 shows an operation of the model producer 18.

A training data set 66 is extracted from the EI mass spectrum library 20. The training data set 66 is formed from a plurality of pieces of training data 68 corresponding to a plurality of first compounds. Each piece of training data 68 is formed from a molecular structure 70 and an EI mass spectrum 72. A plurality of pieces of training data 68 are sequentially supplied to the prediction model 22A (learner). In an embodiment of the present disclosure, each molecular structure 70 is converted into data 74 having a graph structure, and the data 74 are supplied to the prediction model 22A. Various methods of expressing the molecular structure are known. For example, there are known a MOL•SDF file format, linear expression methods such as SMILES and SMARTS, and the like.

With progress of the machine learning, the prediction performance of the prediction model 22A is gradually improved. In an embodiment of the present disclosure, the prediction model 22A is formed from Graph Convolutional Networks. Alternatively, the prediction model 22A may be formed from other machine learning models. The produced prediction model 22A is supplied to the spectrum predictor. When the predicted mass spectrum is produced in the sample analyzing apparatus, the produced prediction model 22A is sent to the sample analyzing apparatus. This configuration will be described later with reference to FIG. 16.

The primary library producer 24 produces the primary library 48 based on the information extracted from the EI mass spectrum library. The produced primary library 48 is transferred to the sample analyzing apparatus.

FIG. 3 shows an example of the primary library 48. In the illustrated example structure, the primary library 48 is formed from a plurality of records 78. Each record 78 includes a compound ID 80, a molecular weight 82, an accurate mass 84, a compositional formula 86, a molecular structure 88, a standard spectrum 90, and the like. Alternatively, information other than the molecular structure 88 and the standard spectrum 90 may be omitted.

Figure 4:
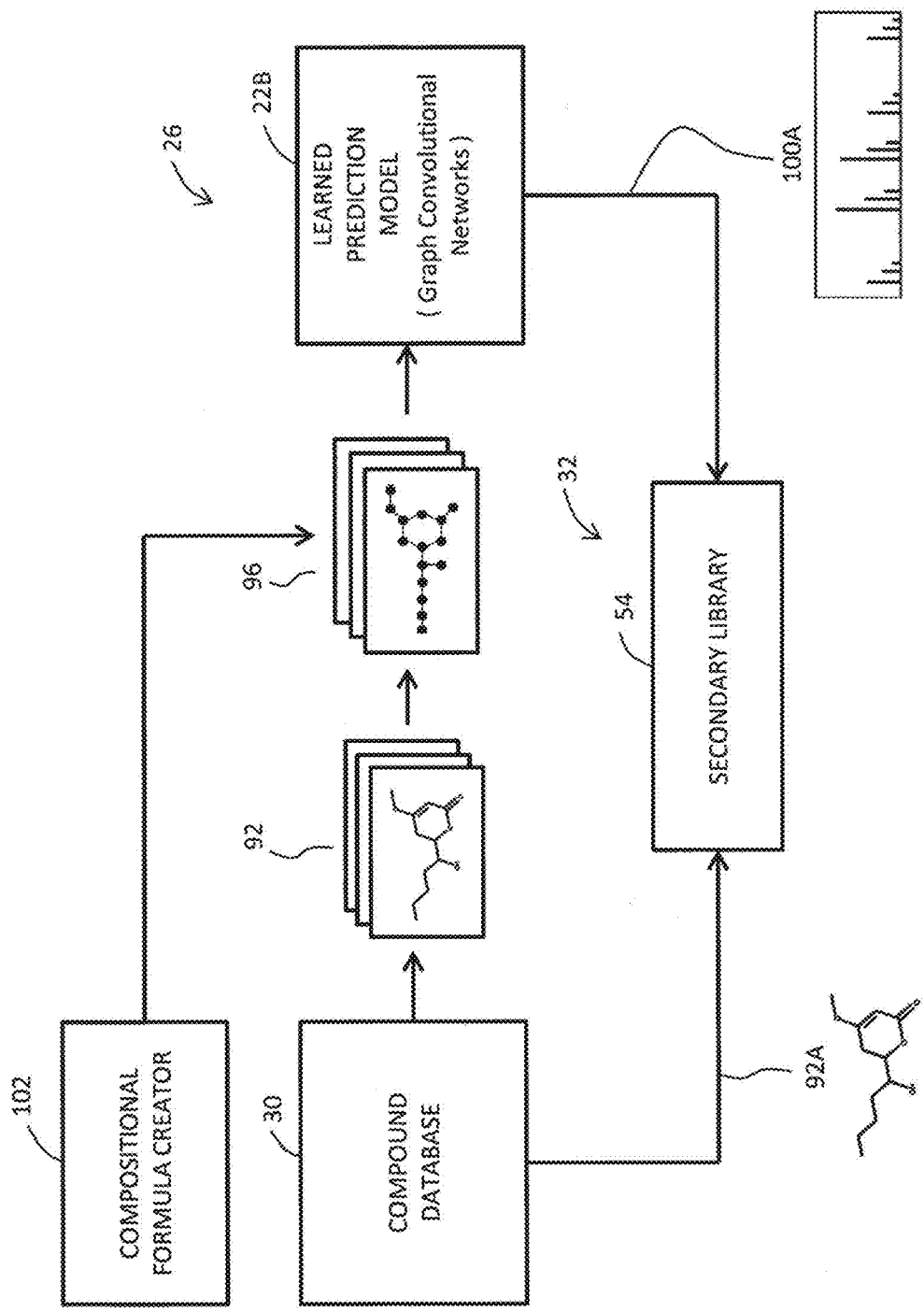
FIG. 4 is a diagram showing a method of predicting a spectrum.

FIG. 4 shows prediction of a mass spectrum. FIG. 4 shows an operation of the spectrum predictor 26.

Figure 5:
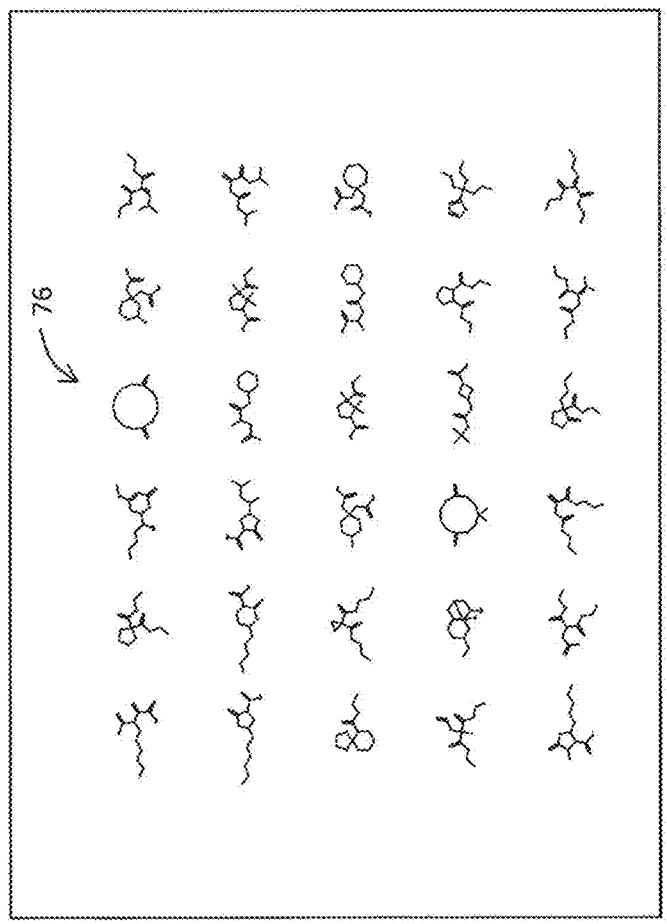
FIG. 5 is a diagram showing an example of a plurality of molecular structures.

A plurality of molecular structures 92 are extracted from the compound database 30, and are sequentially supplied to the trained prediction model 22B. With this process, a plurality of predicted mass spectra 100A are sequentially produced. In an embodiment of the present disclosure, each molecular structure 92 is converted to data 96 representing a graph structure, and the data 96 are input to the prediction model 22B. FIG. 5 exemplifies a part 76 of the plurality of the molecular structures extracted from the compound database.

In FIG. 4, a configuration may be employed in which a plurality of molecular structures are artificially created in a molecular structure creator 102, and are supplied to the prediction model 22B. In this case also, each created molecular structure is converted to the data 96 representing the graph structure, and the data 96 are supplied to the prediction model 22B.

The secondary library producer 32 produces the secondary library 54 based on the plurality of molecular structures 92A which are input to the prediction model 22B, and the plurality of predicted mass spectra 100A which are output from the prediction model 22B.

FIG. 6 shows an example of the secondary library 54. In the illustrated example structure, the secondary library 54 is formed from a plurality of records 104. Each record 104 includes a compound ID 106, a molecular weight 108, an accurate mass 110, a compositional formula 112, a molecular structure 114, a predicted spectrum 116, and the like. When the molecular weight 108 is not used in the secondary search, the molecular weight may be omitted. In either case, information necessary for execution of the secondary search is registered in the secondary library 54.

Figure 7:
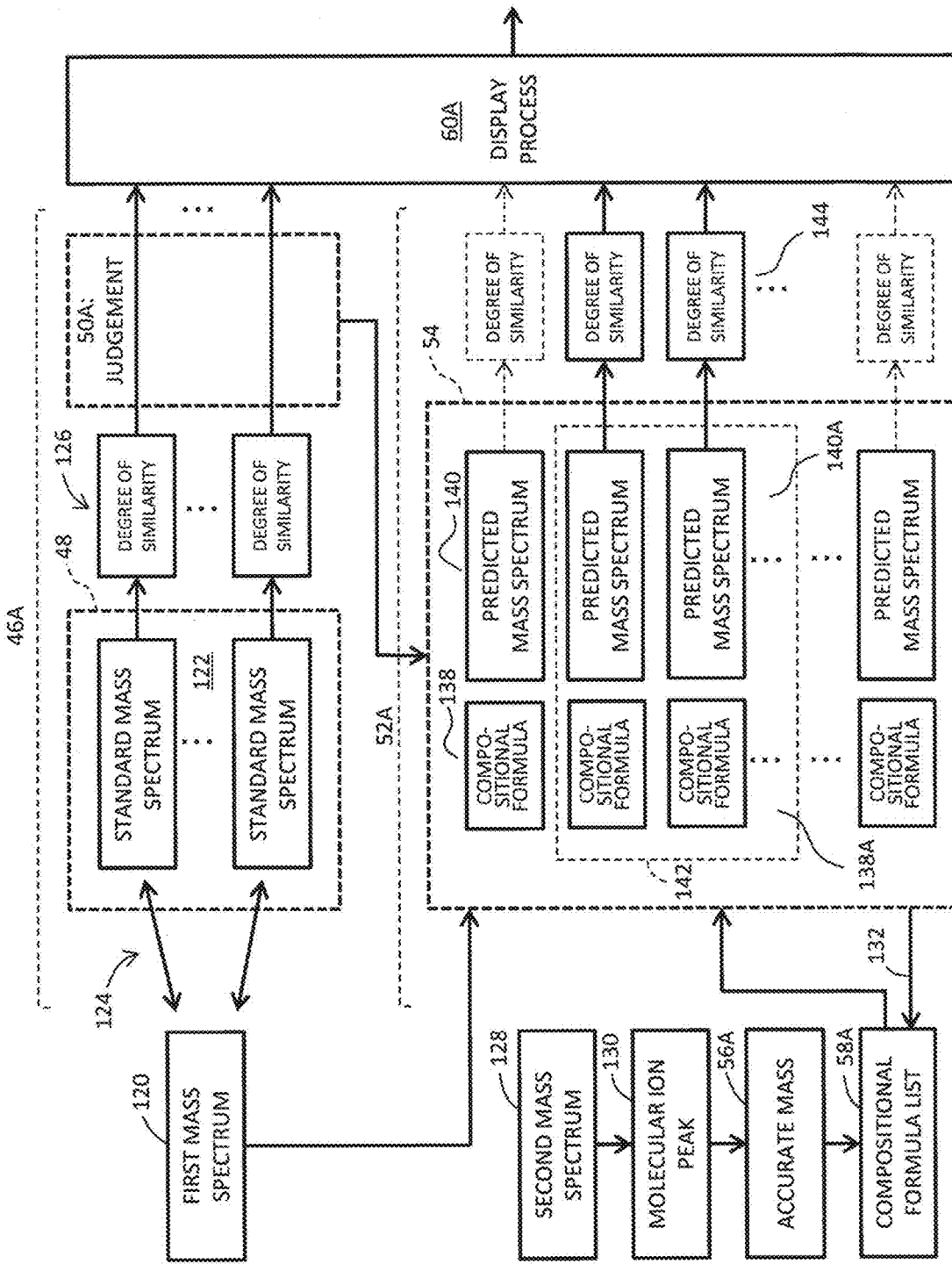
FIG. 7 is a diagram showing an operation of a sample analyzing apparatus according to an embodiment of the present disclosure.

FIG. 7 shows an operation of the sample analyzing apparatus according to an embodiment of the present disclosure; that is, a sample analyzing algorithm according to an embodiment of the present disclosure. Reference numeral 46A shows the primary search. Reference numeral 52A shows the secondary search.

The primary library 48 is searched based on a first mass spectrum 120 (sample EI mass spectrum). Specifically, the first mass spectrum 120 is compared with a plurality of standard mass spectra 122, to thereby calculate a plurality of degrees of similarity 126. Judgment 50A is judgment of enlargement of the search range based on the plurality of degrees of similarity 126. When the enlargement of the search range is not judged, the result of the primary search is sent to a display process 60A.

A molecular ion peak 130 included in a second mass spectrum 128 (sample FI mass spectrum) is identified. An accurate mass 56A is identified based on the molecular ion peak 130. A compositional formula list 58A is produced based on the accurate mass 56A. In this process, the secondary library 54 is referred to as necessary (refer to reference numeral 132).

In the secondary search 52A, for example, a compositional formula 138A is identified which matches a compositional formula in the compositional formula list 58A, from the plurality of compositional formulae 138 in the secondary library 54. With this process, a target of search based on the first mass spectrum 120 is narrowed down to a part 142 in the secondary library 54. This process is a narrowing-down process based on the sample molecular information. The secondary search is executed with respect to the part 142 in the secondary library 54 based on the first mass spectrum 120. Specifically, a plurality of degrees of similarity 144 are calculated between the first mass spectrum 120 and the plurality of predicted mass spectra 140A in the part 142. The result of the secondary search is sent to the display process 60A. For example, a plurality of records determined to be hits in the secondary search are sent to the display process 60A.

For the calculation of the degree of similarity, for example, the following calculation equation is used.

$$S = 1000 \frac{\sum_i m_i \sqrt{A_i P_i}}{\sqrt{\sum_i m_i \cdot A_i} \cdot \sqrt{\sum_i m_i P_i}}$$ [Equation 1]

In the calculation equation described above, S shows the degree of similarity, $m_i$ shows an ith mass, $A_i$ shows an ith intensity in the first mass spectrum, and $P_i$ shows an ith intensity in the predicted mass spectrum.

Alternatively, the degree of similarity may be calculated using a calculation equation other than that described above. The above-described calculation equation or the like may be utilized when the degree of similarity is calculated in the primary search.

Alternatively, the search based on the first mass spectrum may be executed first, and then, an intermediate search result identified by the search may be narrowed down based on the compositional formula list 58A. Alternatively, the matching based on the compositional formula list 58A and the matching based on the first mass spectrum may be executed simultaneously. In either case, as a result of the use of sample information other than the mass spectrum in the secondary search, the secondary search result can be appropriately narrowed down.

Figure 8:
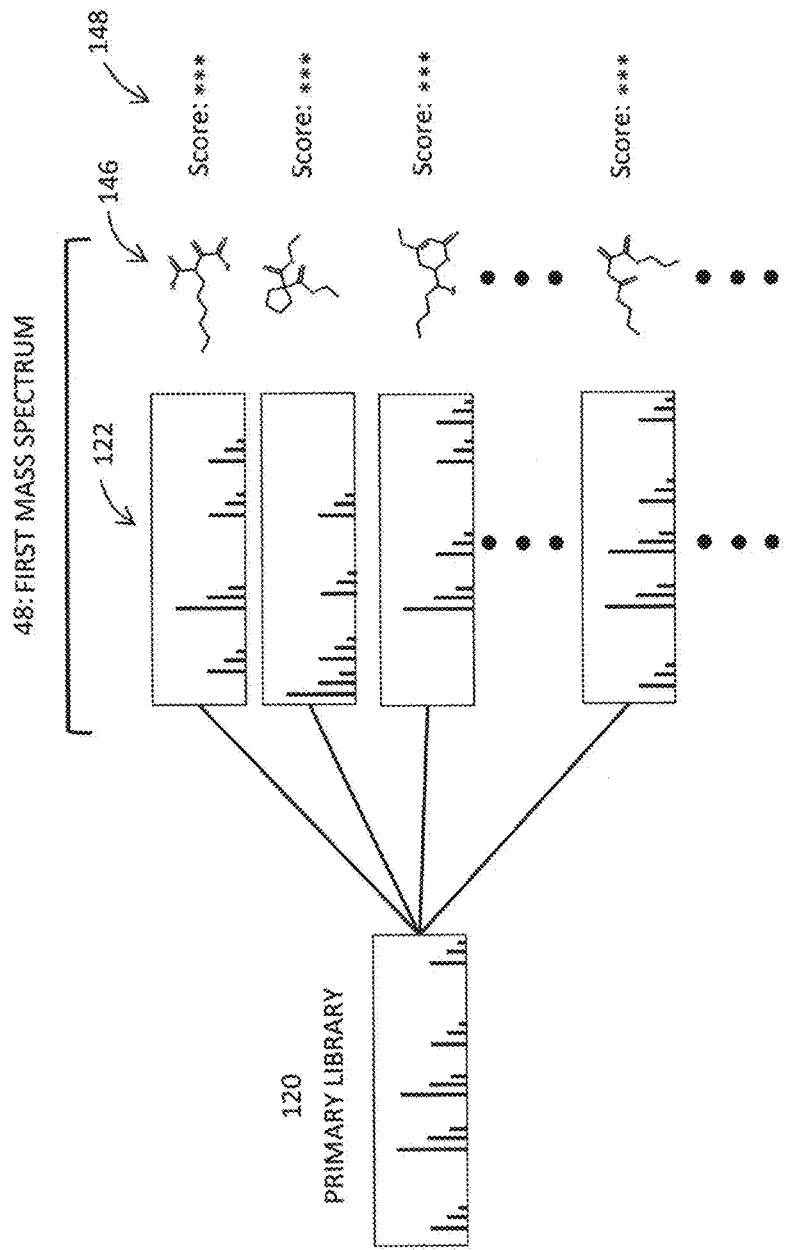
FIG. 8 is a diagram showing an example of a primary search.

FIG. 8 shows a specific example of the primary search. The primary library 48 includes the plurality of standard mass spectra 122 and a plurality of molecular structures 146 corresponding to a plurality of compounds. A plurality of degrees of similarity 148 (scores) are calculated between the first mass spectrum 120 and the plurality of standard mass spectra 122. The enlargement of the search range; that is, the execution of the secondary search, is judged when the plurality of degrees of similarity 148 do not satisfy a predetermined condition.

Figure 9:
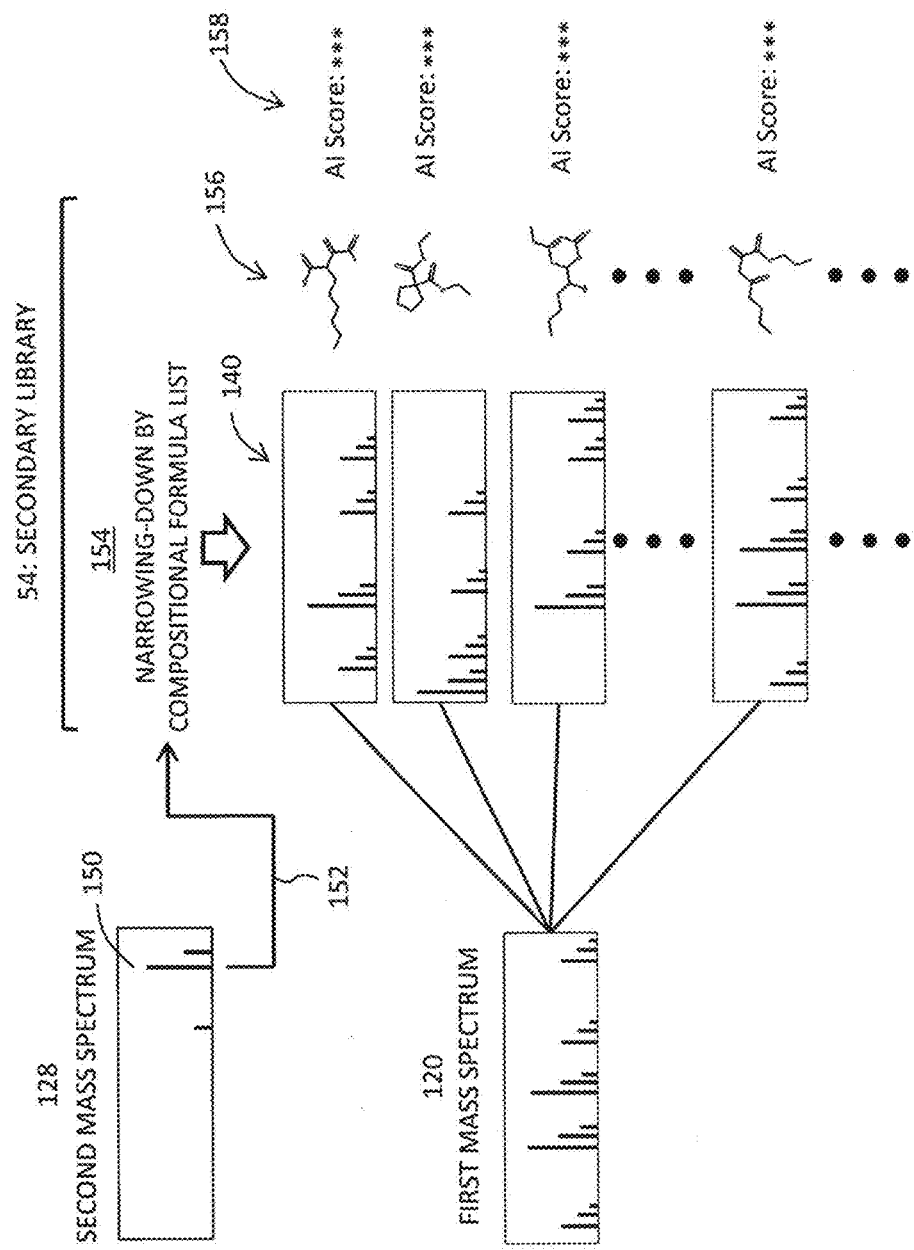
FIG. 9 is a diagram showing an example of a secondary search.

FIG. 9 shows a specific example of the secondary search. The secondary library 54 includes a plurality of predicted mass spectra 140 and a plurality of molecular structures 156 corresponding to a plurality of compounds. An accurate mass 152 is identified based on a molecular ion peak included in the second mass spectrum 128, and a compositional formula list is produced based on the accurate mass.

A plurality of degrees of similarity 158 are calculated between the first mass spectrum 120 and the plurality of predicted mass spectra. In an embodiment of the present disclosure, in the secondary search, as shown by reference numeral 154, the target of the secondary search is narrowed down by the compositional formula list.

A sequence of processes described above are executed for each component (compound) extracted from the original sample. An analysis result is displayed for each composition. The process described above may be applied also when the GC is not provided upstream of the mass spectrometer.

Figure 10:
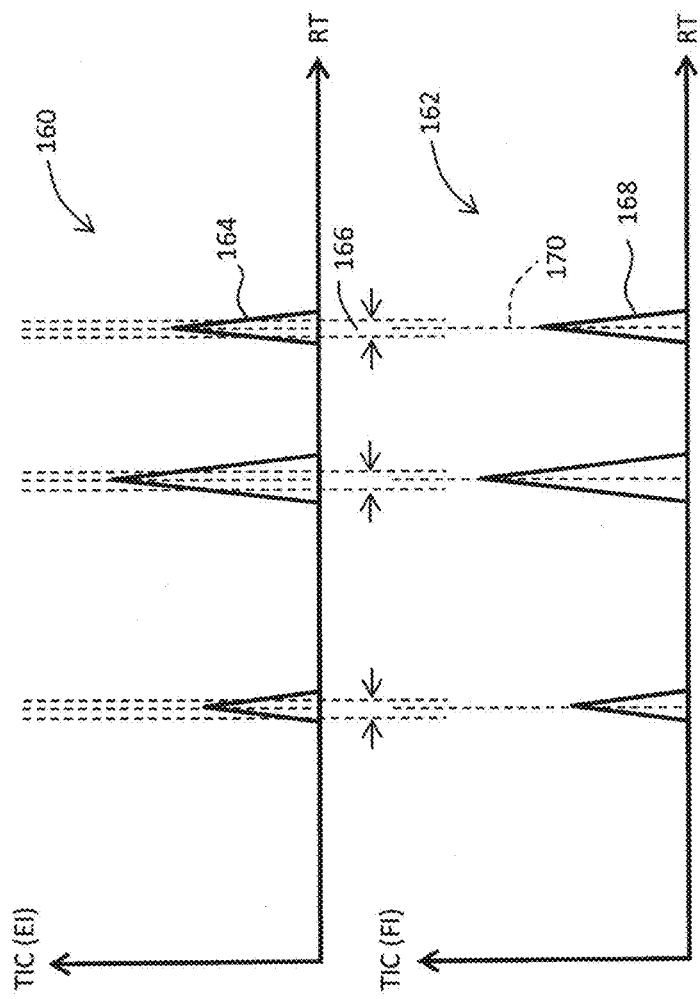
FIG. 10 is a diagram for explaining correlation.

FIG. 10 shows a process on the first mass spectrum array and the second mass spectrum array. An upper part of FIG. 10 shows a first total ion current chromatogram (TICC) 160 produced based on the first mass spectrum array, and a lower part of FIG. 10 shows a second TICC 162 produced based on the second mass spectrum array. The horizontal axis represents retention time (RT), and the vertical axis represents a total ion current (TIC).

The first TICC 160 is produced by accumulating the mass spectra forming the first mass spectrum array. Similarly, the second TICC 162 is produced by accumulating the mass spectra forming the second mass spectrum array. The first TICC 160 has a plurality of first peaks 164 corresponding to a plurality of components that are extracted. Similarly, the second TICC 162 has a plurality of second peaks 168 corresponding to the plurality of extracted components. Each individual peak is identified using a peak detection technique. That is, each individual piece of component (compound) information is identified.

Next, correlation (pairing) is executed between the plurality of first peaks 164 and the second peaks 168. In this process, for example, for each first peak 164, a range 166 is set with the first peak 164 as a reference, and a second peak belonging to the range is identified as a pairing target. Alternatively, each second peak may be set as the reference.

For each component, the plurality of first mass spectra arranged on the retention axis are accumulated, to thereby produce a first accumulated mass spectrum. Similarly, for each component, the plurality of second mass spectra arranged on the retention axis are accumulated, to thereby produce a second accumulated mass spectrum. For each spectrum pair formed from the first accumulated mass spectrum and the second accumulated mass spectrum, the sequence of processes described above are applied.

Figure 11:
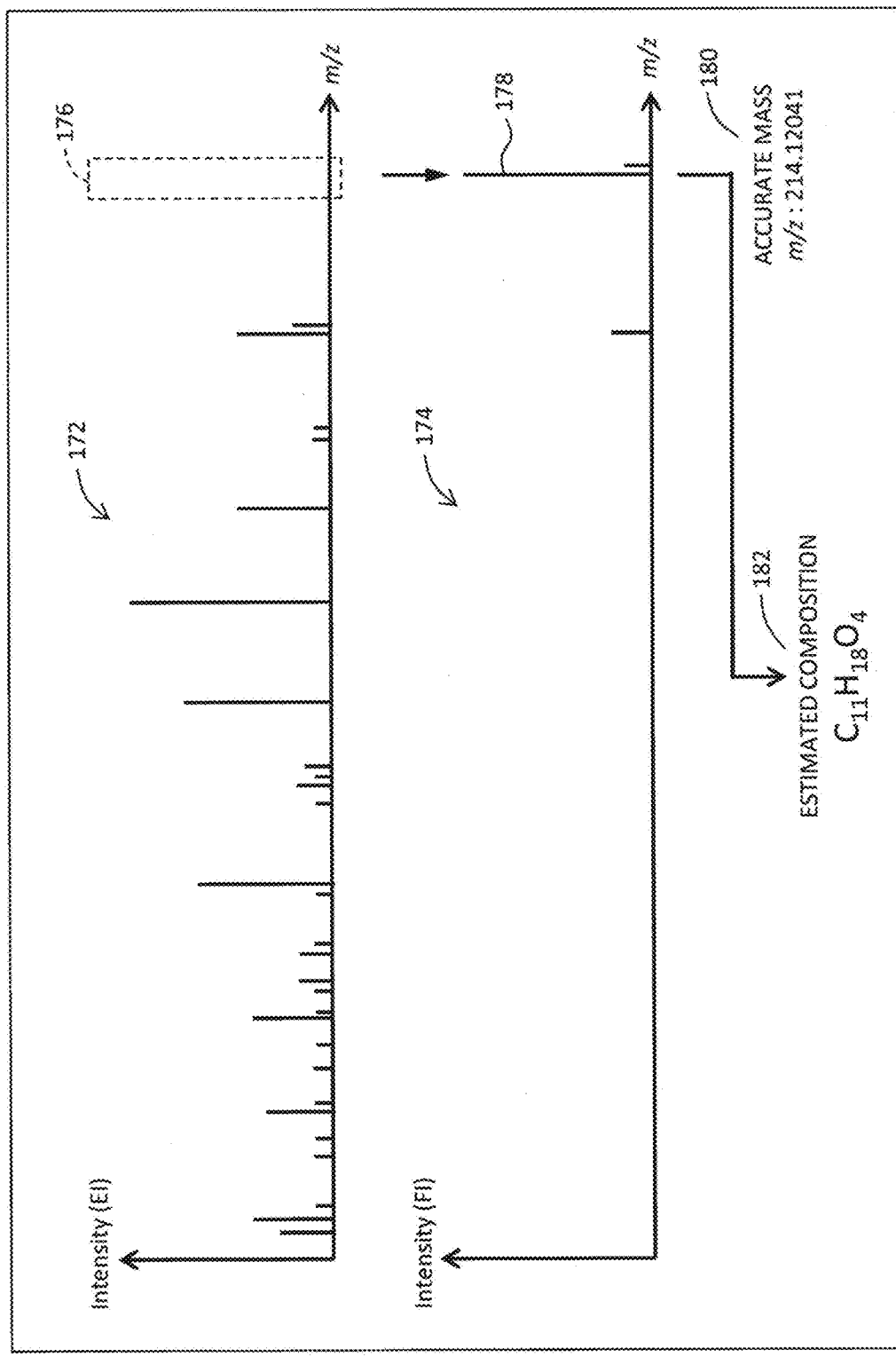
FIG. 11 is a diagram showing an EI mass spectrum and an FI mass spectrum.

FIG. 11 shows a first accumulated mass spectrum 172 and a second accumulated mass spectrum 174 which are paired. Through comparison of the first accumulated mass spectrum 172 and the second accumulated mass spectrum 174, a molecular ion peak 178 included in the second accumulated mass spectrum 174 is identified. In the illustrated example configuration, the first accumulated mass spectrum 172 does not include a clear molecular ion peak (refer to reference numeral 176). An accurate mass 180 is identified based on (m/z) at which the molecular ion peak 178 is caused, and the compositional formula is estimated based on the accurate mass (refer to reference numeral 182).

Figure 12:
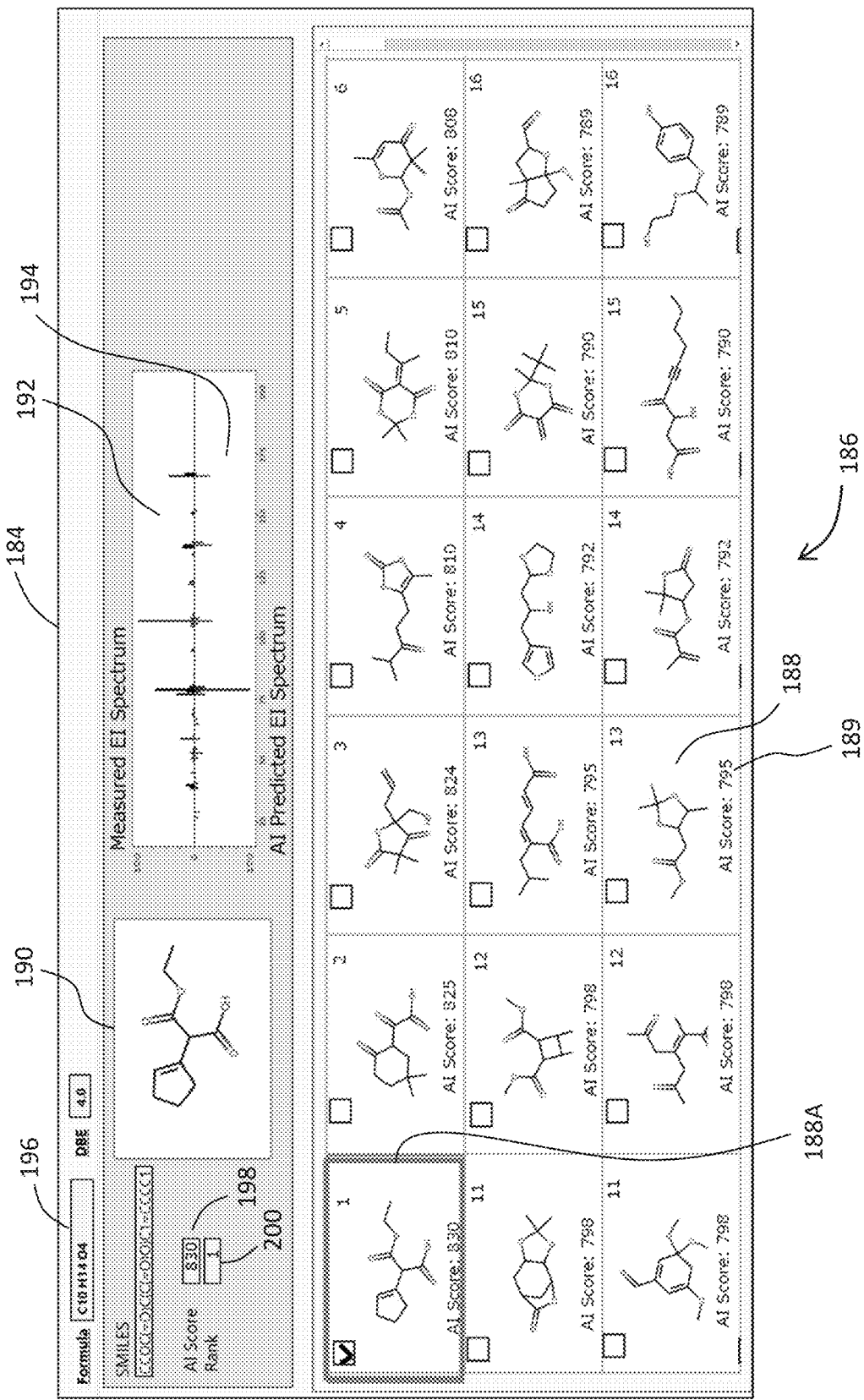
FIG. 12 is a diagram showing an example of an image showing a result of secondary search.

FIG. 12 shows an image 184 showing the second search result. The image 184 includes a molecular structure list 186 formed from a plurality of molecular structures identified by the secondary search. The plurality of molecular structures are arranged in the order of magnitude of the degree of similarity. A score 189 indicating the degree of similarity is attached to each molecular structure 188. Currently, a state is shown in which a top molecular structure 188A is being selected.

The image 184 includes an enlarged image 190 of the selected molecular structure. A field 198 shows the score attached to the selected molecular structure. A field 200 shows a rank of the selected molecular structure. A field 196 displays a compositional formula corresponding to the selected molecular structure. The image 184 includes a first mass spectrum 192 acquired from the sample, and a predicted mass spectrum 194 matched thereto.

Figure 13:
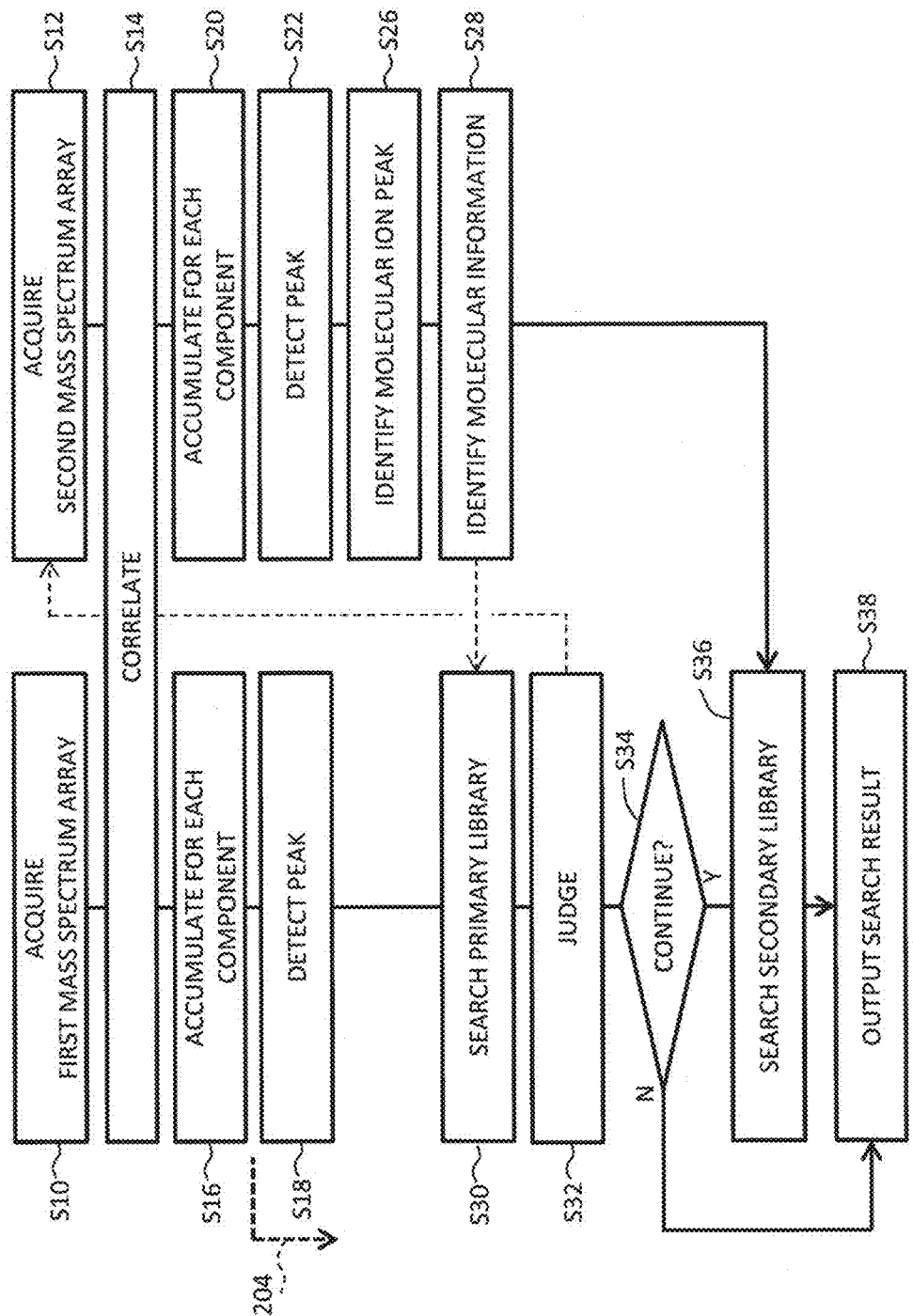
FIG. 13 is a flowchart showing a method of analyzing a sample according to an embodiment of the present disclosure.

FIG. 13 shows a method of analyzing a sample according to an embodiment of the present disclosure. In S10, the first mass spectrum array is acquired. Meanwhile, in S12 the second mass spectrum array is acquired. In S14, the peak pairing (correlation) is executed based on the first TICC produced from the first mass spectrum array and the second TICC produced from the second mass spectrum array. The correlation may alternatively be executed at another timing.

In S16, for each component, the plurality of the first mass spectra are accumulated to produce the first accumulated mass spectrum. In S20, for each component, the plurality of second mass spectra are accumulated to produce the second accumulated mass spectrum. In the following, the first accumulated mass spectrum will be simply called a first mass spectrum, and the second accumulated mass spectrum will be simply called a second mass spectrum. As shown by reference numeral 204, the processes of S18 and S22 and on are executed for each component.

In S18, the peak detection is executed with respect to the first mass spectrum, to produce a first peak list. In S22, the peak detection is executed with respect to the second mass spectrum, to produce a second peak list.

In S26, a molecular ion peak is identified based on the second peak list. So long as the molecular ion peak can be identified in S26, S22 may be omitted. In S28, molecular information, more specifically, a plurality of compositional formulae, is identified based on the molecular ion peak. Alternatively, as the molecular information, the molecular weight or the accurate mass may be identified.

In S30, the primary search with respect to the primary library is executed based on the first mass spectrum (more specifically, the first peak list). In the primary search, the molecular information identified in S28 may be utilized. That is, the primary search with respect to the primary library may be executed based on the molecular information and the first mass spectrum. With the use of the molecular information in the primary search, the precision of the primary search can be improved and judgment precision by the judging unit can be improved.

In S32, the primary search result is evaluated. Specifically, necessity of the secondary search is judged. When it is judged that the secondary search is not necessary in S32, S38 is executed via S34, and the primary search result is displayed.

On the other hand, when it is judged that the secondary search is necessary in S32; that is, when the enlargement of the search range is judged, S36 is executed via S34. In S36, the secondary search with respect to the secondary library is executed based on the molecular information and the first mass spectrum. Then, in S38, the secondary search result is displayed. When the plurality of degrees of similarity calculated by the secondary search do not satisfy a predetermined condition, non-registration may be judged, and the judgment may be notified to the user.

Figure 14:
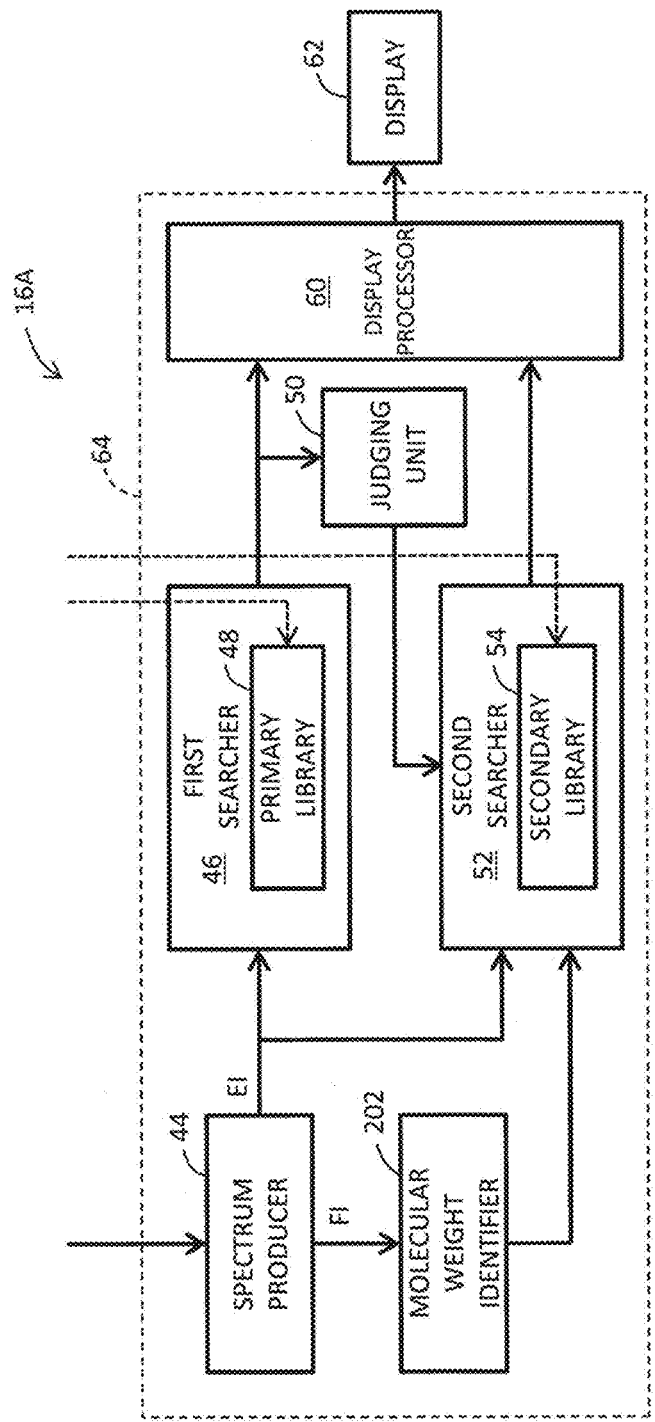
FIG. 14 is a block diagram showing a first alternative configuration.

FIG. 14 shows an information processing unit 16A according to a first alternative configuration. In FIG. 14, elements similar to those of FIG. 1 are assigned the same reference numerals. This is similarly true for FIGS. 15 and 16 to be described below.

In the first alternative configuration shown in FIG. 14, a molecular weight identifier 202 is provided for identifying a molecular weight (integer mass) based on the molecular ion peak included in the second mass spectrum. In the second searcher 52, the secondary search with respect to the secondary library 54 is executed based on the molecular weight and the first mass spectrum. In the first alternative configuration, the molecular weight is used as the sample molecular information during the secondary search. Alternatively, the accurate mass may be used as the sample molecular information in place of the molecular weight.

Figure 15:
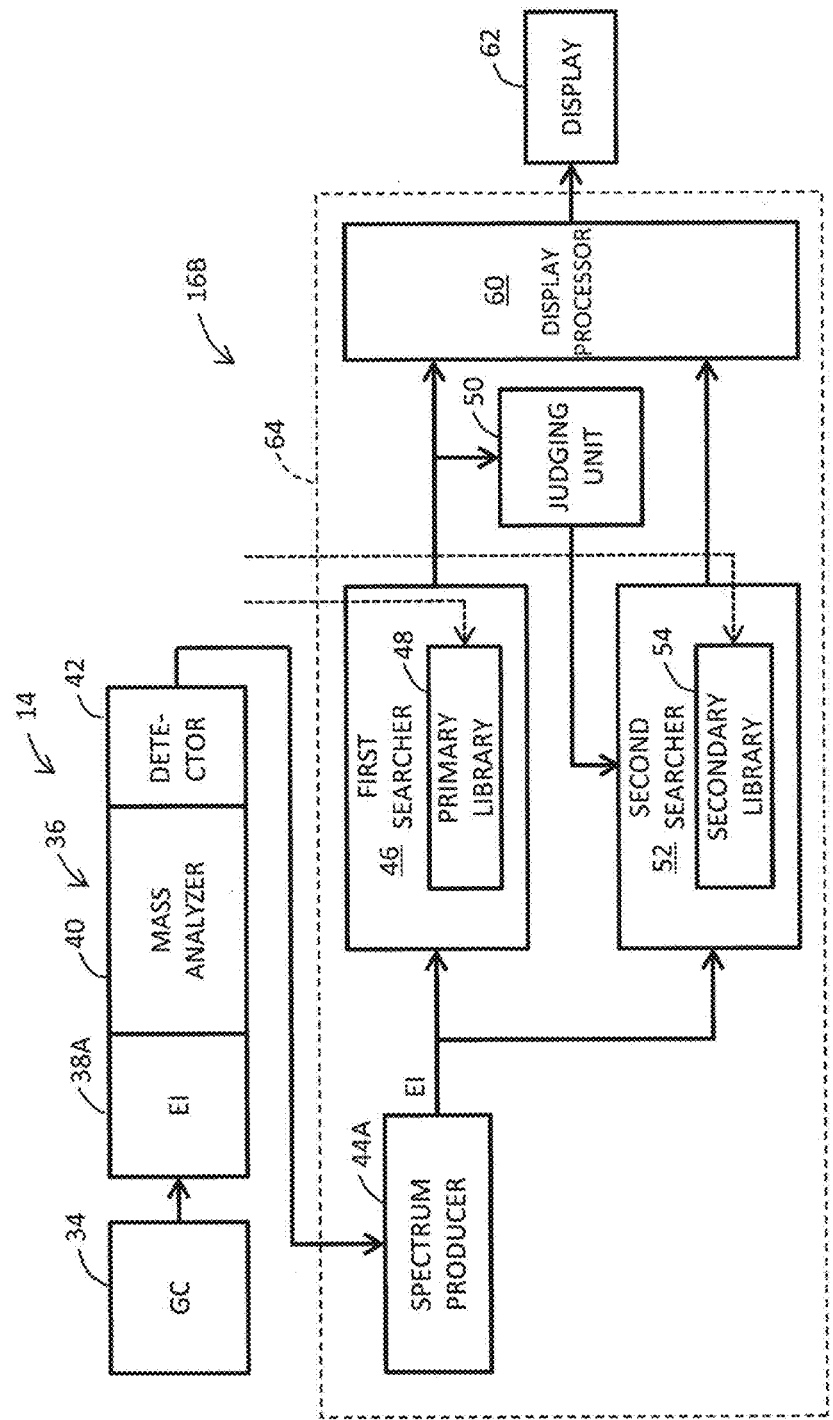
FIG. 15 is a block diagram showing a second alternative configuration.

FIG. 15 shows a second alternative configuration. An ion source 38A included in the mass spectrometer 36 is an ion source following the EI method, and does not correspond to the soft ionization method. In a spectrum producer 44A, only the first mass spectrum serving as the EI mass spectrum is produced. In the second searcher 52, the secondary search with respect to the secondary library 54 is executed based on the first mass spectrum.

In the manner described above, it is also possible to execute the secondary search without the use of the molecular information. According to the second alternative configuration, the structure of the sample analyzing apparatus can be simplified, and, in particular, the contents of the secondary library 54 can be simplified. On the other hand, according to the second alternative configuration, narrowing-down by the molecular information is not possible in the secondary search. When a high estimation precision is desired, it is more desirable to employ the structure of FIG. 1.

Figure 16:
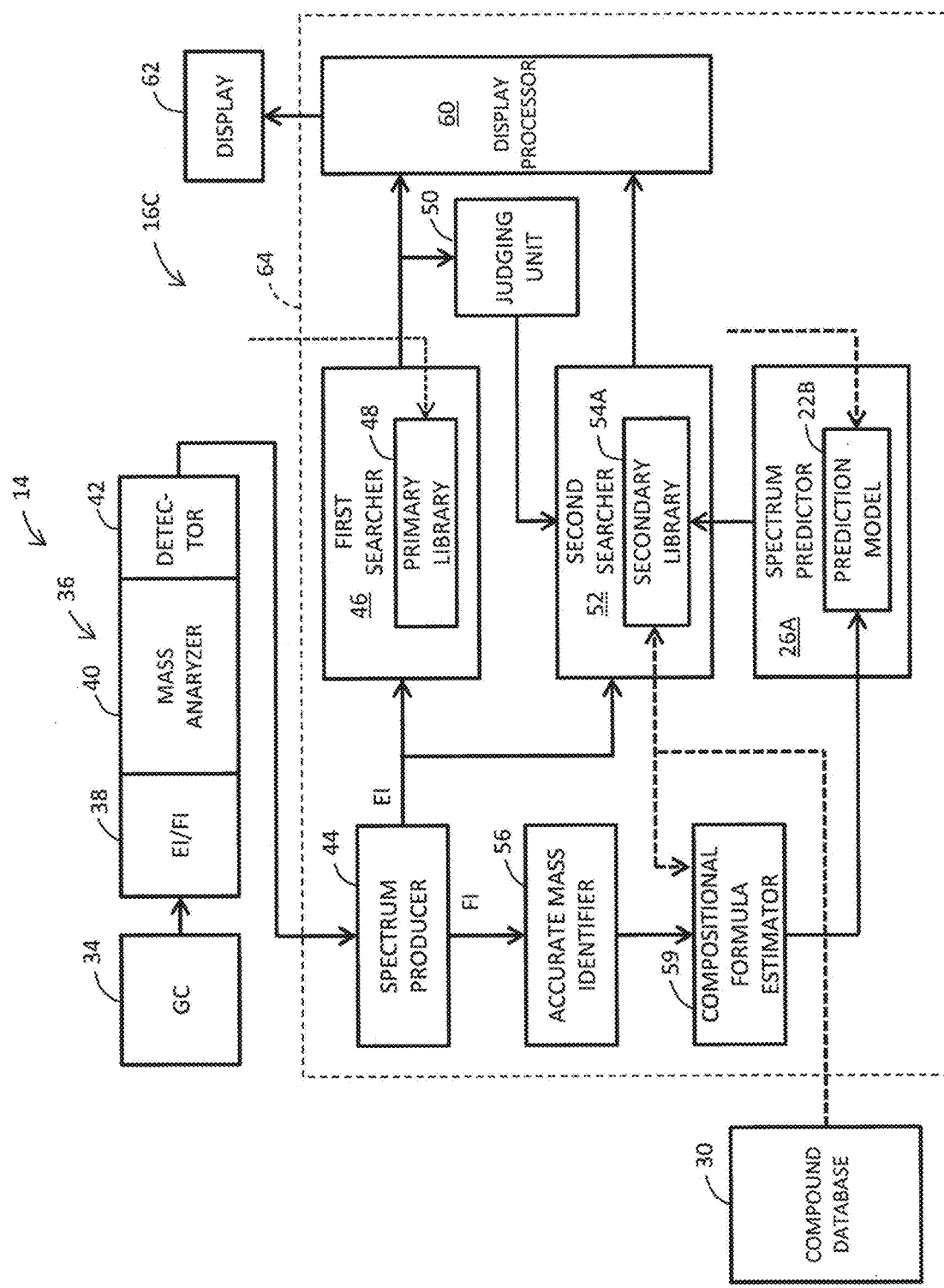
FIG. 16 is a block diagram showing a third alternative configuration.

FIG. 16 shows a third alternative configuration. An information processing unit 16C includes a spectrum predictor 26A. The spectrum predictor 26A realizes a function similar to that of the spectrum predictor 26 shown in FIG. 1.

Specifically, the accurate mass identifier 56 identifies an accurate mass corresponding to the molecular ion peak based on the molecular ion peak in the second mass spectrum produced by the spectrum producer 44. A molecular structure estimator 59 estimates a plurality of molecular structures based on the accurate mass. In this process, the compound database 30 is referred to, or a secondary library 54A is referred to.

A plurality of molecular structures are supplied to the prediction model 22B provided in the spectrum predictor 26A, to thereby produce a plurality of predicted mass spectra. The plurality of predicted mass spectra that are produced are registered in the secondary library 54A. In this process, a plurality of molecular structures corresponding to the plurality of predicted mass spectra are also registered in the secondary library 54A. The registration of the plurality of molecular structures may be omitted by referring to the compound database 30. The secondary library 54A has, for example, a structure shown in FIG. 6. The second searcher 52 executes the secondary search with respect to the secondary library 54A based on the first mass spectrum.

According to the third alternative configuration, the secondary search result can be narrowed down based on the accurate mass prior to the secondary search. That is, only a plurality of predicted mass spectra which possibly correspond can be set as the target of search. With this configuration, reliability of the secondary search result can be improved. Alternatively, the molecular weight may be used in place of the accurate mass. However, when the molecular weight is used, in comparison to the case when the accurate mass is used, the number of predicted mass spectra that are produced is increased. When the time or burden for producing the plurality of predicted spectra are not ignorable, it is desirable to create the secondary library in advance. That is, the employment of the structure shown in FIG. 1 is desirable.

The invention claimed is:

1. A sample analyzing apparatus comprising:
 a first memory configured to store a primary library having a plurality of standard mass spectra acquired from a plurality of compounds forming a first compound group, and a plurality of molecular structures corresponding to the plurality of standard mass spectra;
 a second memory configured to store a secondary library having a plurality of predicted mass spectra corresponding to a plurality of compounds forming a second compound group, and a plurality of molecular structures corresponding to the plurality of predicted mass spectra; and
 a processor, configured to:
 execute a primary search with respect to the primary library based on a sample mass spectrum acquired from a sample;
 judge enlargement of a search range based on a result of the primary search; and
 execute a secondary search with respect to the secondary library based on the sample mass spectrum, when it is judged that the search range is to be enlarged, to thereby estimate a molecular structure of the sample.

2. The sample analyzing apparatus according to claim 1, wherein
 the plurality of predicted mass spectra are a plurality of mass spectra predicted from the plurality of molecular structures corresponding to the plurality of compounds forming the second compound group.

3. The sample analyzing apparatus according to claim 1, wherein
 the first compound group and the second compound group differ from each other.

4. The sample analyzing apparatus according to claim 1, wherein
 the processor is configured to judge the enlargement of the search range based on a plurality of degrees of similarity calculated between the sample mass spectrum and the plurality of standard mass spectra.

5. The sample analyzing apparatus according to claim 1, wherein
 when a result of the secondary search is displayed, a predicted mass spectrum determined to be a hit in the secondary search is displayed along with the sample mass spectrum.

6. The sample analyzing apparatus according to claim 1, wherein
 the processor is configured to execute the secondary search in such a manner that a result of the secondary search is narrowed down by sample molecular information acquired through mass spectrometry of the sample.

7. The sample analyzing apparatus according to claim 6, wherein
 the sample molecular information is at least one of a molecular weight, an accurate mass, or a compositional formula.

8. The sample analyzing apparatus according to claim 6, wherein
 the secondary library has a plurality of pieces of compound molecular information corresponding to the plurality of compounds forming the second compound group, and
 the processor is configured to execute the secondary search with respect to the secondary library based on the sample molecular information and the sample mass spectrum.

9. The sample analyzing apparatus according to claim 6, wherein
 the sample molecular information is identified based on a molecular ion peak included in another sample mass spectrum acquired from the sample.

10. The sample analyzing apparatus according to claim 9, wherein
 the sample mass spectrum is a mass spectrum acquired through application of a hard ionization method, and
 the other sample mass spectrum is a mass spectrum acquired through application of a soft ionization method.

11. The sample analyzing apparatus according to claim 6, wherein
 the processor is further configured to produce a plurality of predicted mass spectra based on the sample molecular information, and
 the plurality of predicted mass spectra in the secondary library are the plurality of predicted mass spectra produced by the processor.

12. A method of analyzing a sample, the method comprising:

executing, based on a sample mass spectrum acquired from a sample, a primary search with respect to a primary library having a plurality of standard mass spectra acquired from a plurality of compounds forming a first compound group, and a plurality of molecular structures corresponding to the plurality of standard mass spectra;

judging enlargement of a search range based on a result of the primary search; and executing, based on the sample mass spectrum, a secondary search with respect to a secondary library having a plurality of predicted mass spectra corresponding to a plurality of compounds forming a second compound group, and a plurality of molecular structures corresponding to the plurality of predicted mass spectra, when it is judged that the search range is to be enlarged, to thereby estimate a molecular structure of the sample.

13. A storage medium non-transitorily storing a program for executing a method of analyzing a sample in an information processing apparatus, the program, when executed, causing the information processing apparatus to execute a process comprising:

executing, based on a sample mass spectrum acquired from a sample, a primary search with respect to a primary library having a plurality of standard mass spectra acquired from a plurality of compounds forming a first compound group, and a plurality of molecular structures corresponding to the plurality of standard mass spectra;

judging enlargement of a search range based on a result of the primary search; and executing, based on the sample mass spectrum, a secondary search with respect to a secondary library having a plurality of predicted mass spectra corresponding to a plurality of compounds forming a second compound group, and a plurality of molecular structures corresponding to the plurality of predicted mass spectra, when it is judged that the search range is to be enlarged, to thereby estimate a molecular structure of the sample.

* * * * *